United States Patent Office 3,166,560
Patented Jan. 19, 1965

1

3,166,560
6-ALKYLMORPHINAN DERIVATIVES
Yoshiro Sawa and Shin Maeda, Hyogo Prefecture, and Naoki Tsuzi, Osaka Prefecture, Japan, assignors to Shionogi & Co., Ltd., Osaka, Japan
No Drawing. Filed Apr. 4, 1963, Ser. No. 270,556
Claims priority, application Japan, Apr. 9, 1962, 37/14,252
2 Claims. (Cl. 260—285)

The present invention relates to 6-alkylmorphinan derivatives and production thereof.

In the term "morphinan" herein employed, there are included all the compounds having a fundamental structure representable by the folowing-plane formula:

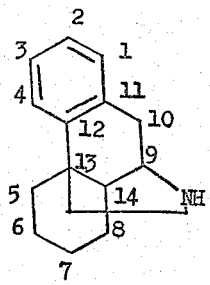

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro-2H-10,4a - iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The objective 6-alkylmorphinan derivative in the present invention is representable by the following plane formula:

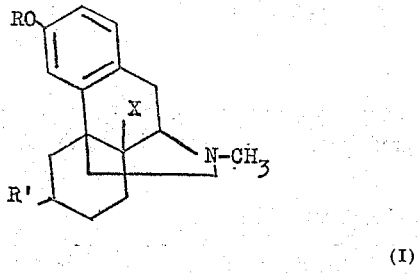

(I)

wherein R represents a hydrogen atom or a methyl group, R′ represents a lower alkyl group (e.g. methyl, ethyl, propyl) and X represents a hydrogen atom or a hydroxyl group and shows pharmacological activities such as analgesic activity and antitussive activity.

Accordingly, a basic object of the present invention is to embody the 6-alkylmorphinan derivative of Formula I. Another object of the invention is to embody the pharmacologically active 6-alkylmorphinan (I). A further object of the invention is to embody a process for preparing the 6-alkylmorphinan (I). These and other objects will be apparent to those conversant with the art to which the present invention pertains from the subsequent description.

2

The process of the present invention is illustratively represented by the following scheme:

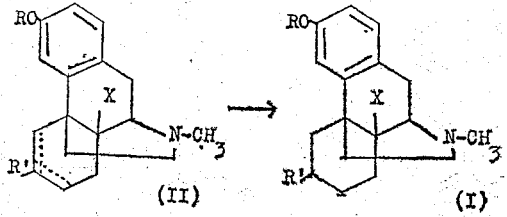

wherein R, R′ and X each has the same significance as designated above and in Formula II, a double bond exists between the 6-position and the adjacent position thereto.

As the starting material, there may be used the optically active or racemic $\Delta^5$ or $^6$-6-alkylmorphinan of Formula II.

According to the process of the present invention, the starting $\Delta^5$ or $^6$-6-alkylmorphinan (II) is subjected to hydrogenation to produce the 6-alkylmorphinan (I). Although various conventional hydrogenation procedures can be adopted for attaining the object, the application of catalytic hydrogenation is preferred. For instance, the hydrogenation reaction may be effected by treating the $\Delta^5$ or $\Delta^6$-6-alkylmorphinan (II) with hydrogen in the presence of a catalyst such as platinum catalyst (e.g. platinum, platinum dioxide, platinum black, platinum-carbon), palladium catalyst (e.g. palladium, palladium monoxide, palladium black, palladium carbon, palladium-strontium carbonate, palladium-barium sulfate) and nickel catalyst (e.g. Raney nickel, Urushibara nickel) in an inert solvent medium (e.g. water, methanol, ethanol, ether, tetrahydrofuran, dioxane, benzene, acetic acid), usually at room temperature (15 to 30° C.) under atmospheric pressure.

The objective 6-alkylmorphinan (I) occurs in optically active form as well as in racemic mixture and these are all within the scope of the present invention.

The 6-alkylmorphinan (I) forms acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The thus-produced 6-alkylmorphinan (I) and acid addition salts thereof exhibit pharmacological activity such as analgesic activity and antitussive activty. For instance, the analgesic activity, antitussive activity and toxicity of some compounds according to the present invention are shown in the following table:

TABLE

| Compound | Analgesic activity | | Antitussive activity | Toxicity (LD$_{50}$, mg./kg.) |
|---|---|---|---|---|
| | A | B | | |
| (−)-3-Methoxy-6α,N-dimethyl-morphinan (cis) | 2.2 | 2.3 | 6.9 | 154 |
| (−)-3-Methoxy-6α,N-dimethyl-morphinan (cis) tartrate | 9.1 | 50.0 | 20.3 | 168 |
| (−)-3-Hydroxy-6β,N-dimethyl-morphinan (cis) hydrobromide | 1.2 | 1.4 | | 263 |
| (−)-3-Hydroxy-6α,N-dimethyl-14-hydroxymorphinan (cis) | 2.5 | 11.0 | | 562 |

NOTE.—The analgesic activity was observed by the Haffner-Hesse method [Hesse: Arch. exp. Path. u. Pharm., vol. 158, p. 233 (1930)] in mice (A) and the D'Amour-Smith method [D'Amour et al.: J. Pharmacol., vol. 1, p. 255 (1946)] in rats (B) and is shown as the effective ratio to morphine, the value of which is expressed as 1. The antitussive activity was observed by the Winter method [Winter et al.: J. Exper. Med., vol. 101, p. 17 (1955)] in guinea pigs and is shown as the effective ratio to codeine, the value of which is expressed as 1. The toxicity was tested by intravenous administration of the tested compound to mice.

Accordingly, they are useful as analgesic and/or antitussive agents.

Practical and presently preferred embodiments of the present invention are illustrated by the following examples. In the examples, mg.=milligram(s), g.= gram(s), ml.=millilitre(s) and °C.=degrees centigrade. Other abbreviations have conventional meanings.

*Example 1*

Preparation of (—)-3-methoxy-6,N-dimethylmorphinan (cis):

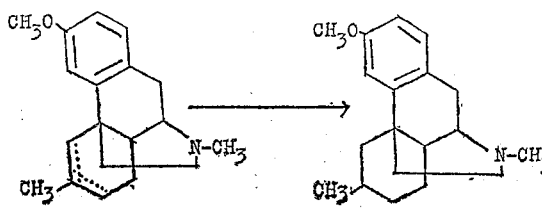

To a solution of a mixture of (—)-3-methoxy-6,N-dimethyl-Δ⁵-morphinan (cis) and (—)-3-methoxy-6,N-dimethyl-Δ⁶-morphinan (cis) (4.4 g.) in methanol (50 ml.), there is added palladium carbon prepared from palladium chloride (0.44 g.), activated carbon (0.88 g.) and 5% hydrochloric acid (8.8 ml.), and the resultant mixture is shaken at room temperature (15 to 30° C.) in hydrogen stream. After absorption of the theoretical amount of hydrogen, the reaction mixture is filtered to separate the catalyst. The filtrate is distilled to remove methanol, made to alkalinity with aqueous sodium carbonate and shaken with ether. The ether extract is evaporated and the residue crystallized from ether or acetone to give (—)-3-methoxy-6,N-dimethyl-morphinan (cis) (4.1 g.) as crystals melting at 118 to 119° C. $[\alpha]_D^{25}$ —28.7° (1.952% ethanol).

*Analysis.*—Calcd. for $C_{19}H_{27}ON$: C, 79.95; H, 9.54; N, 4.91. Found: C, 79.60; H, 9.43; N, 4.99.

The picrate, M.P. 157 to 158° C. (crystallized from ethanol).

The tartrate, M.P. 163 to 164° C. (crystallized from acetone).

The starting material of this example, a mixture of (—)-3-methoxy-6,N-dimethyl-Δ⁵-morphinan (cis) and (—)-3-methoxy-6,N-dimethyl-Δ⁶-morphinan (cis), is prepared from desoxydihydrothebainone [Sawa et al.: Tetrahedron, vol. 15, p. 154 (1961)] according to the following scheme:

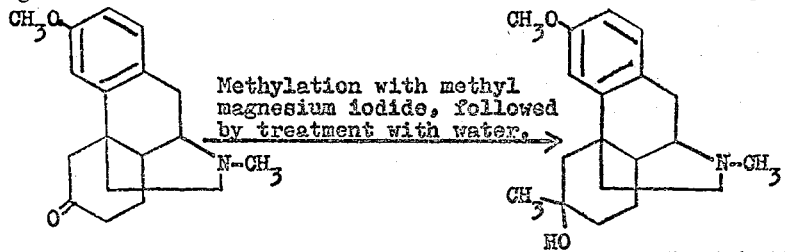

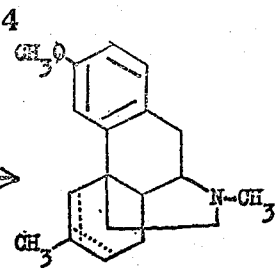

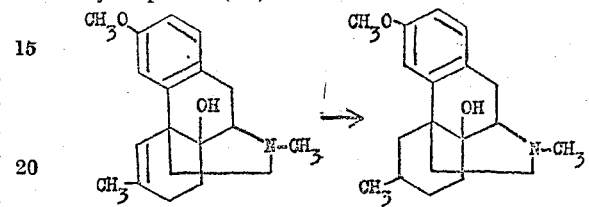

*Example 2*

Preparation of (—)-3-methoxy-6,N-dimethyl-14-hydroxymorphinan (cis):

To a solution of (—)-3-methoxy-6,N-dimethyl-14-hydroxy-Δ⁵-morphinan (cis) (300 mg.) in 10% acetic acid (10 ml.), there is added platinum dioxide (30 mg.), and the resultant mixture is shaken at room temperature (15 to 30° C.) in hydrogen stream. After absorption of hydrogen (1.25 molar equivalent) in 4 hours, the reaction mixture is filtered to separate the catalyst. The filtrate is concentrated under reduced pressure to a ⅓ to ¼ volume. The condensate is neutralized with ammonia-water and shaken with dichloromethane. The dichloromethane extract is evaporated to give a mixture (290 mg.) of (—)-3-methoxy-6α,N-dimethyl-14-hydroxymorphinan (cis) and (—)-3-methoxy-6β,N-dimethyl-14-hydroxymorphinan (cis) as a solid melting at 94 to 104° C. The mixture is crystallized from 95% ethanol and the firstly crystallized substance recrystallized from 95% ethanol to give (—)-3-methoxy-6α,N-dimethyl-14-hydroxymorphinan (cis) as crystals melting at 110 to 111° C. $[\alpha]_D^{24}$ —40° (1% chloroform).

*Analysis.*—Calcd. for $C_{19}H_{27}O_2N$: C, 75.71; H, 9.03; N, 4.65. Found: C, 75.64; H, 9.08; N, 4.68.

The starting material of this example, (—)-3-methoxy-6,N-dimethyl-14-hydroxy-Δ⁵-morphinan (cis), is prepared from thebaine according to the following scheme:

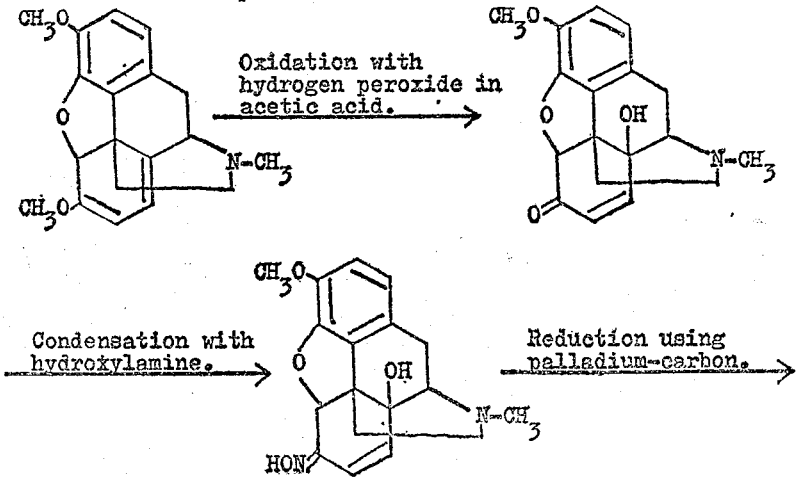

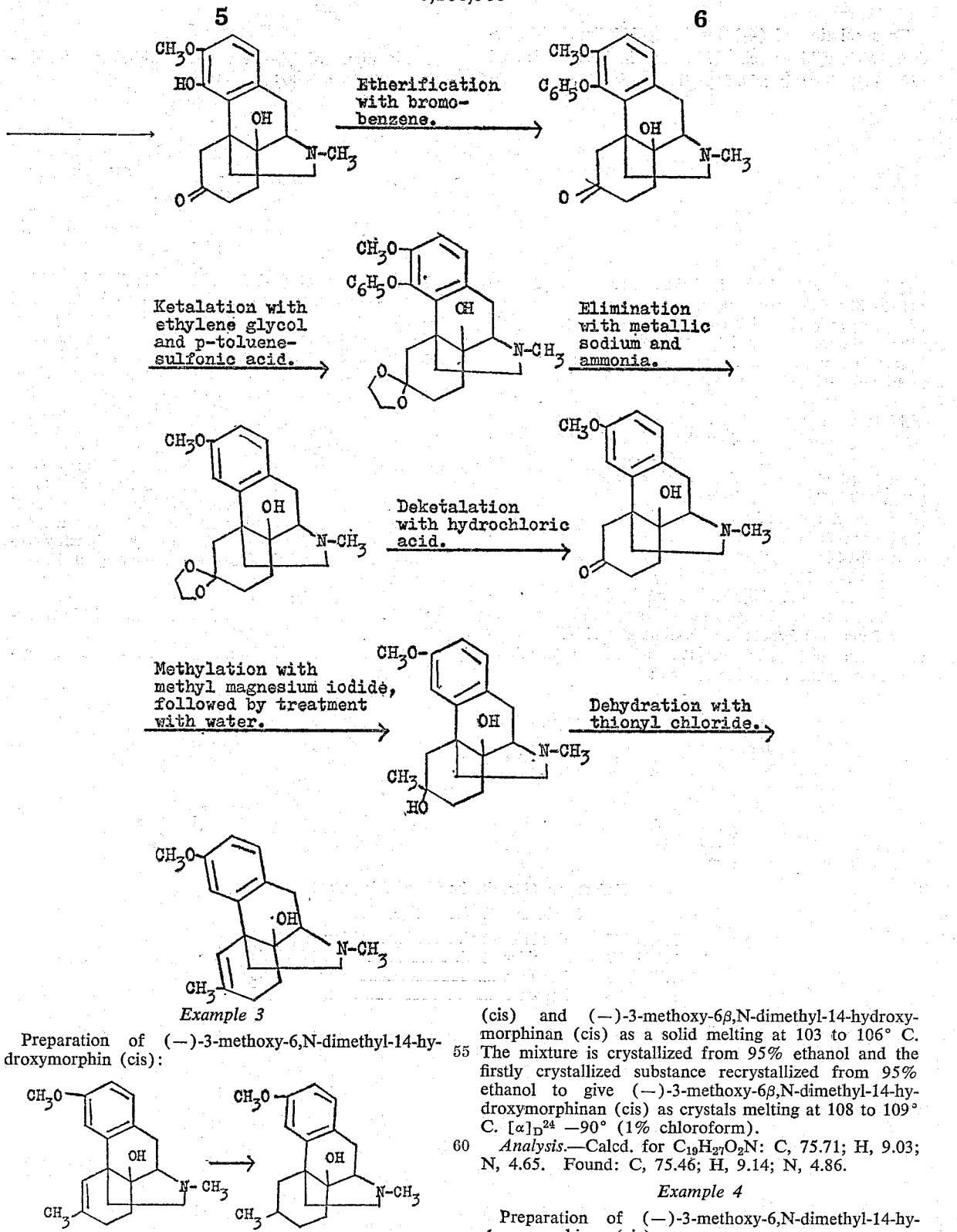

Example 3

Preparation of (—)-3-methoxy-6,N-dimethyl-14-hydroxymorphin (cis):

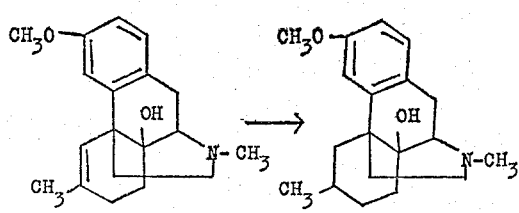

To a solution of (—)-3-methoxy-6,N-dimethyl-14-hydroxy-Δ⁵-morphinan (cis) (300 mg.) in 10% acetic acid (10 ml.), there is added palladium carbon prepared from palladium chloride (100 mg.), activated carbon (200 mg.) and 5% hydrochloric acid (2 ml.), and the resultant mixture is shaken at room temperature (15 to 30° C.) in hydrogen stream. After absorption of hydrogen (1.3 molar equivalent) in 8 hours, the reaction mixture is treated as in Example 2 to give a mixture (250 mg.) of (—)-3-methoxy-6α,N-dimethyl - 14 - hydroxymorphinan (cis) and (—)-3-methoxy-6β,N-dimethyl-14-hydroxymorphinan (cis) as a solid melting at 103 to 106° C. The mixture is crystallized from 95% ethanol and the firstly crystallized substance recrystallized from 95% ethanol to give (—)-3-methoxy-6β,N-dimethyl-14-hydroxymorphinan (cis) as crystals melting at 108 to 109° C. $[\alpha]_D^{24}$ —90° (1% chloroform).

Analysis.—Calcd. for $C_{19}H_{27}O_2N$: C, 75.71; H, 9.03; N, 4.65. Found: C, 75.46; H, 9.14; N, 4.86.

Example 4

Preparation of (—)-3-methoxy-6,N-dimethyl-14-hydroxymorphinan (cis):

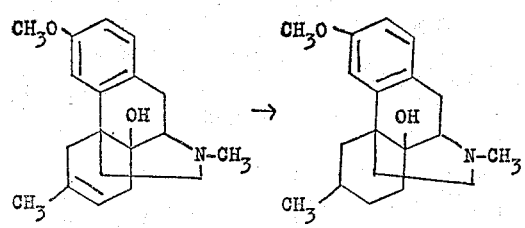

To a solution of (—)-3-mehtoxy-6,N-dimethyl-14-hydroxy-Δ⁶-morphinan (cis) (300 mg.) in 10% acetic acid (10 ml.), there is added platinum dioxide (30 mg.),

Example 5

Preparation of (—)-3-methoxy-6,N-dimethyl-14-hydroxymorphinan (cis):

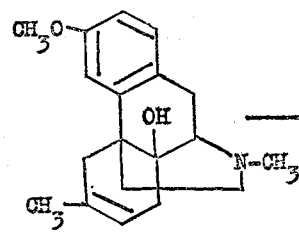

and the resultant mixture is shaken at room temperature (15 to 30° C.) in hydrogen stream. After absorption of hydrogen (1.2 molar equivalent) in 1 hour, the reaction mixture is filtered to separate the catalyst. The filtrate is concentrated under reduced pressure to a ⅓ to ¼ volume. The condensate is neutralized with ammonia water and shaken with dichloromethane. The dichloromethane extract is evaporated to give a mixture (298 mg.) of (—)-3-methoxy-6α,N-dimethyl-14-hydroxymorphinan (cis) and (—)-3-methoxy-6β,N-dimethyl-14-hydroxymorphinan (cis) as a solid melting at 85 to 101° C. The mixture is crystallized from 95% ethanol and the firstly crystallized substance recrystallized from 95% ethanol to give (—)-3-methoxy-6α,N-dimethyl-14-hydroxymorphinan (cis) as crystals melting at 110 to 111° C.

The starting material of this example, (—)-3-methoxy-6,N-dimethyl-14-hydroxy-Δ⁶-morphinan (cis), is prepared from (—)-3-methoxy-6,N-dimethyl-6,14-dihydroxymorphinan (cis) [cf. Example 2 of this specification] according to the following scheme:

To a solution of (—)-3-methoxy-6,N-dimethyl-14-hydroxy-Δ⁶-morphinan (cis) (300 mg.) in 10% acetic acid (10 ml.), there is added palladium carbon prepared from palladium chloride (100 mg.), activated carbon (200 mg.) and 5% hydrochloric acid (2 ml.), and the resultant mixture is shaken at room temperature (15 to 30° C.) in hydrogen stream. After absorption of hydrogen (1.3 molar equivalent) in 5 hours, the reaction mixture is treated as in Example 4 to give a mixture (247 mg.) of (—)-3-methoxy-6α,N-dimethyl-14-hydroxymorphinan (cis) and (—)-3-methoxy-6β,N-dimethyl-14-hydroxy-morphinan (cis) as a solid melting at 100 to 107° C. The mixture is crystallized from 95% ethanol and the firstly crystallized substance recrystallized from 95% ethanol to give (—)-3-methoxy-6β,N-dimethyl-14-hydroxymorphinan (cis) as crystals melting at 108 to 109° C.

What is claimed is:
1. 3 - lower alkoxy-6,N-di(lower)alkyl-14-hydroxymorphinan.
2. (—)-3-methoxy-6,N-dimethyl - 14 - hydroxymorphinan (cis).

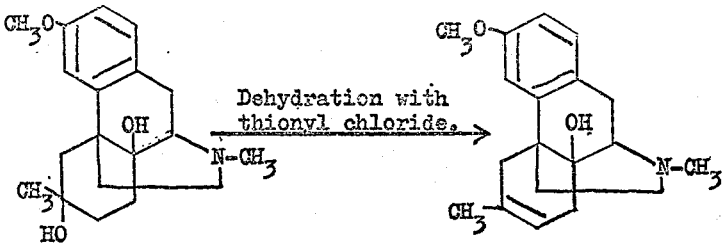

References Cited in the file of this patent
UNITED STATES PATENTS

| | | |
|---|---|---|
| 2,619,485 | Chabrier et al. | Nov. 25, 1952 |
| 2,676,177 | Schnider et al. | Apr. 20, 1954 |
| 2,723,268 | Henecka | Nov. 8, 1955 |
| 3,068,234 | Brown | Dec. 11, 1962 |